3,375,138
FUEL CELL AND ELECTROLYTE COMPRISING A BOROPHOSPHORIC ACID-PHOSPHORIC ACID GEL
William B. Mather, Jr., Fishkill, N.Y., assignor to Texaco Inc., New York, N.Y., a corporation of Delaware
Filed Sept. 25, 1963, Ser. No. 311,415
7 Claims. (Cl. 136—86)

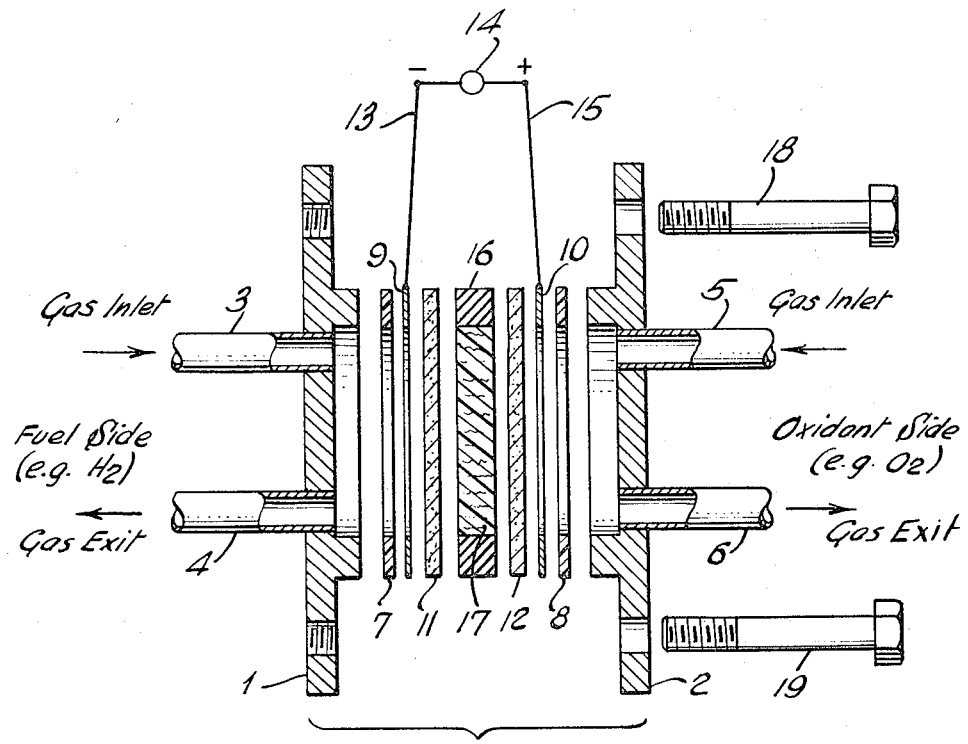

ABSTRACT OF THE DISCLOSURE

A borophosphoric acid-phosphoric acid gelled electrolyte serves as the electrolyte in a fuel cell operating at 100 to 250° C. The gelled electrolyte is prepared by mixing phosphoric acid with boric acid in a mole ratio of boric acid to phosphoric acid of between 1:7 and 1:2, while maintaining a temperature between 150° and 250° C. for as long as 72 hours. In fuel cells utilizing this electrolyte, such fuels as hydrogen, saturated aliphatic hydrocarbons, carbon monoxide and methanol may be used. Either pure oxygen or air is suitable as the oxidizing gas.

---

This invention relates to a novel intermediate temperature fuel cell electrolyte, fuel cells containing said electrolyte and a process for operating said fuel cells. More particularly, the invention pertains to gelled borophosphoric acid-phosphoric acid electrolyte and the utilization thereof in fuel cells.

Unless otherwise stated I intend by the term "phosphoric acid" ortho-phosphoric acid, i.e., $H_3PO_4$.

A fuel cell is a well known electrochemical device for directly converting chemical energy into electrical energy without an intermediate thermal energy stage such as the heat engine stage found in the conventional power plant method of generating electricity. In a fuel cell, a fuel generally in the form of a gas is oxidized with an oxygen containing gas to produce electricity directly. A typical cell has two electrodes immersed into and separated by an electrolyte and externally attached to an electric load device such as an electric motor. The fuel gas such as hydrogen, gaseous saturated aliphatic hydrocarbons carbon monoxide, methanol, formaldehyde, formic acid and mixtures thereof is fed to the anode and the oxygen containing gas is supplied to the cathode. At the anode, the fuel is oxidized releasing electrons and the released electrons are picked up by the anode, carried through the external circuit, containing the electrical load device, to the cathode where they reduce oxygen and, with hydrogen ions from the electrolyte, form water.

Fuel cells can be broadly classified into three general types. First type is the high temperature fuel cell which operates at a temperature greater than about 600° C. The high temperature fuel cells use solid oxide or molten carbonate electrolytes. They have the advantage of being able to use a relatively inexpensive electrode material such as stainless steel, iron filings, metallic silver, iron oxide and the like. The high temperature cells also normally do not require anode catalysts. However, they do have the distinct disadvantage of high cell resistance, slow start up time, inefficient use of the fuel and a material handling and corrosion problem due to the high temperature of operation.

A second type of fuel cell is the low temperature cell which operates at a temperature of less than about 100° C. generally at ambient temperature. This cell utilizes a fairly fluid highly conductive electrolyte such as aqueous potassium hydroxide. The low temperature cell has the advantage of being able to operate at room temperature and utilizes inexpensive electrode catalysts. Disadvantages are that when porous electrodes are used, they are easily flooded by the fluid aqueous electrolyte resulting in a sharp decrease in the power output of the cell. The electrolytes of the low temperature fuel cell are easily poisoned by impurities in the fuel and oxygen feed such as carbon monoxide, light olefins and carbon dioxide.

The third type of fuel cell in which the electrolyte of this invention is employed is the intermediate temperature fuel cell which operates in the range of between about 100° and 300° C. In the past the fluid aqueous electrolytes described in the low temperature cell were often employed in the intermediate temperature cell. One of the disadvantages of such electrolyte in the intermediate temperature cell in addition to electrode flooding, is that the use of high pressures, e.g., of the order of 600 lbs. per square inch in order to prevent the water in the aqueous electrolyte from evaporating, are required.

I have discovered and this constitutes an aspect of my invention, a gelled electrolyte for an intermediate temperature fuel cell which has excellent electrical conductivity without permitting short circuiting. In addition, the electrolyte of the invention maintains essentially a constant consistency whether the cell is operating at a temperature of 100° C. or 250° C. Further, the consistency of the electrolyte is such as to be fluid enough as to readily permit the current flow via proton transfer yet immobile enough so that the electrolyte does not flood the porous electrodes normally employed in fuel cell operation or leak out through any cracks in the cell. Still further, the electrolyte of the invention does not require pressure to maintain its stability, is not reduced by hydrogen, does not decompose under operational temperatures, and is not readily poisoned by impurities normally found in the fuel and oxidizer gases such as carbon dioxide, carbon monoxide, and light olefins. Also, the novel electrolyte being relatively non-volatile does not require superatmospheric pressure at the contemplated temperatures of the intermediate temperature fuel cell to maintain it in a non-gaseous phase.

It is to be noted that one of the outstanding features of the electrolyte of the invention is that its fluidity or expressed another way, its consistency remains relatively constant in the operative temperature range of the cell, that is, about 100–250° C., and therefore, if the cell's temperature is increased from 100° to 250° C. for greater power, there is no danger of flooding the electrodes due to increased fluidity of the electrolyte.

In contrast, related electrolytes have serious disadvantages. For example, o-phosphoric acid gelled with carbon black and copper phthalocyanine permitted short circuits to develop in the cell resulting in very low open circuit voltage. Phosphoric acid gelled with silica or a mixture of silica and alumina were converted to high resistance solids by extended heating at temperatures above 150° C. Free $H_3PO_4$, polyvinyl pyridine gelled $H_3PO_4$, and ferric and molybdate phosphate gasses all performed well as electrolytes but leaked out of the operating intermediate temperature fuel cell in a short period of time.

The borophosphoric acid-phosphoric acid gel of the invention is a mixture of borophosphoric acid and phosphoric acid in which the mole ratio of borophosphoric acid to phosphoric acid is between about 1:6 and 1:1, preferably between 1:5 and 1:3. The gel may be also described as comprising about 14 mole percent to 50 mole percent $BPO_4$ and 86 mole percent to 50 mole percent $H_3PO_4$.

In the function of the gel as a current transfer medium in the fuel cell it is theorized that borophosphoric acid functions as the agent which gives the gel its stable consistency and the phosphoric acid acts as the current carrier. It is believed that the current is carried through the gel via proton transfer as represented by the following equation:

$$H_2 + 2H_3PO_4 \rightarrow 2H_4PO_4^+ + 2e^-$$

As indicated from the above equation, the phosphoric acid carries the hydrogen ion from the anode to the cathode and the free electrons are transferred through the external circuit from the anode to the cathode. Since the cell of the invention can operate without the presence of water, the cell does not transfer current through a hydronium ion in accordance with the following equation:

$$H_2 + 2H_2O \rightarrow 2H_3O^+ + 2e^-$$

The borophosphoric acid-phosphoric acid gel is prepared by mixing phosphoric acid with the boric acid in a mole ratio of boric acid to phosphoric acid of between about 1:7 and 1:2, preferably between about 1:6 and 1:4 at a temperature between about 150 and 250° C. for an extended period (e.g., 72 hours) to produce a white gel having a penetration (consistency) at 25° C. (ASTM test D-1403) of between about 200 and 400. The following equation further illustrates the reaction:

$$H_3BO_3 + \text{excess } H_3PO_4 \rightarrow BPO_4 + 3H_2O + \text{excess } HPO_4$$

A critical feature in the preparation of the electrolyte of the invention is the maintenance of the minimum reactant mole ratio of boric acid to phosphoric acid about 1:7. This ratio is necessary in order to produce a gel of a consistency which will not flood the porous electrodes of a fuel cell and yet be fluid enough to permit the ready transfer of the proton through the gel. It is to be noted that for a proper fuel cell operation, there must be a triple interface at each electrode, namely, fuel or oxidizer, electrode surface and electrolyte. If the electrolyte floods the entire cell, the fuel or oxidizer is unable to contact the electrode surface. Therefore, the electrolyte has to be of such a consistency as to penetrate only a portion of the porous electrode.

Another material aspect of the invention is to maintain the boric acid to phosphoric acid reactant ratio below about 1:2 since higher ratios of the electrolyte produce a gel of such hard consistency as to either prevent the transfer of the proton or produce a cell resistance so high as to render the cell utilizing said electrolyte commercially impracticable.

Still another aspect of the invention is maintenance of the temperature of preparation between about 150 and 250° C. At temperatures below about 150° C., the borophosphoric acid ingredient is not formed. At temperatures above about 250° C., unless superatmospheric pressure is employed, any formed orthophosphoric acid is converted into pyrophosphoric acid as represented by the following equation:

$$2H_3PO_4 \rightarrow H_4P_2O_7 + H_2O$$

Pyrophosphoric acid is a poor proton transfer medium, and therefore, as its content increases in the borophosphoric acid-phosphoric acid electrolyte of the invention, cell resistance proportionally increases.

This conversion feature of phosphoric acid into pyrophosphoric acid renders critical the operation temperature of the cell. If the fuel cell operates at above about 250° C., superatmospheric pressure is required to prevent the loss of water, said loss resulting in the conversion of the phosphoric acid into the non-conductive pyrophosphoric acid.

It is to be noted that in preparation of the gel of the invention, it is desirable to utilize phosphoric acid reactant solutions having an acid content between about 85 and 100 wt. percent. If the water content in the acid reactant is greater than 50 wt. percent the final electrolyte will not form a gel.

In the operation of fuel cell utilizing the electrolyte of the invention, fuels which may be employed are hydrogen, saturated aliphatic hydrocarbons which are gases at the cell temperature operation (e.g., methane, ethane, propane, butane and pentane), carbon monoxide and methanol. When saturated aliphatic hydrocarbons, carbon monoxide or methanol are utilized as fuels, water must also be introduced with the fuel so that it can react with the fuel to produce the hydrogen ions and free electrons as indicated by the following exemplary equations:

$$C_4H_{10} + 8H_2O \rightarrow 4CO_2 + 26H^+ + 26e^-$$

$$CO + H_2O \rightarrow CO_2 + 2H^+ + 2e^-$$

$$CH_3OH + H_2O \rightarrow CO_2 + 6H^+ + 6e^-$$

In respect to the oxidizer that can be employed in the cell, either pure oxygen or air are suitable. In the preferred operation of the cell hydrogen is the fuel and pure oxygen is the oxidizer.

In regard to electrode materials which may be employed in the fuel cell of the invention, carbon, the platinum and palladium metals (e.g., platinum, palladium, indium, ruthenium, rhodium, osmium) and tantalum are suitable. Since phosphoric acid is corrosive at temperatures in the range of 100–250° C., the electrode materials are limited to those substances which are conductive and which will resist the corrosive forces of the phosphoric acid. The electrode structure must be porous in nature in order to permit the three interface system to be present in the electrode, that is, fuel or oxidizer, electrolyte and electrode surface. The pore diameters are desirably of between about 1 and 100 microns. The pores are advantageously tapered with the largest diameters at the electrode surface and the smallest diameter at the electrode center. The taper of the pore gives the greatest effective surface while maintaining the pore diameters small enough at the center of the electrode to prevent the electrolyte from flooding to the fuel or oxidizer side of the electrode. The larger the effective surface of the electrode the greater the current generated therefrom. If a porous carbon electrode is employed, one method of tapering the pores is heating the porous electrode to a temperature of 900° C. in a carbon dioxide atmosphere. At this temperature carbon dioxide reacts with the carbon of the porous electrode forming carbon monoxide with the reaction being more intense at the electrode surface. This subject matter is disclosed and claimed in a later-filed application owned by the assignee herein, application Ser. No. 428,253, filed Jan. 26, 1965.

Under advantageous conditions, the electrode surfaces are constructed of catalytic materials which facilitate the chemical breakdown of the fuel at the anode, the reduction of the oxygen at the cathode, and promote at the cathode the producton of water rather than the less current producing hydrogen peroxide. Suitable catalysts are any of the platinum metals such as platinum, palladium and iridium as well as tantalum and tungsten. When a non-catalytic electrode is employed such as carbon, catalysts are advantageously applied thereto in an amount of between about 1 and 25 milligrams per square centimeter of surface. Catalyst can be applied in a number of ways, for example, aqueous chloroplatinic acid (e.g., 3 grams $H_2PtCl_6 \cdot 6H_2O$ per 20 mls. of $H_2O$) is soaked into the electrode. The electrode is drip dried and reduced in a stream of hydrogen at 300° C. or in a solution of hydrazinium dichloride at 50° C. Instead of using aqueous chloroplatinic acid, an ethanol-methanol chloroplatinic acid solution (e.g., 2 grams of $H_2PtCl_6 \cdot 6H_2O$ per 20 milliliters of alcohol) may be employed. This alcohol solution of chloroplatinic acid is dripped or painted evenly on one surface of a hot (100° C.) porous carbon electrode. The treated electrode is then reduced in $H_2$ at 225° C. The catalyzed side of the electrode is faced toward the electrolyte in the fuel cell. The volume ratio of ethanol to methanol is about 10:1. It is to be noted that the electrode coated with platinum from an ethanol-methanol solution of chloroplatinic acid generates more power than an electrode coated with an aqueous solution of chloroplatinic acid. The reason for this is that the platinum is better distributed in the electrode pores near the electrolyte.

Powdered catalysts can be applied to the porous carbon electrodes by slurrying the powder with isopropanol and painting the slurry on one side of the carbon plate. The electrode is then sprayed with a binder such as polyperfluoroethylene (e.g., Teflon) and the electrode is dried to remove the isopropanol. Palladium black, tantalum carbide and platinum black are particularly suitable for this type of catalytic application.

The invention will be more readily understood by the following description of a fuel cell in which the electrolyte is operative:

The figure of the drawing is an exploded cross sectional side view of the fuel cell installation. The materials which compose the cell are chosen for their thermal stability and resistance to corrosion by hot phosphoric acid such as stainless steel, polytetrafluoroethylene (Teflon), tantalum, platinum and carbon. The external surface of an exemplary cell is formed by circular plates 1 and 2 which are fitted with a fuel inlet tube 3 and fuel exit tube 4 and oxidizer inlet tube 5 and oxidizer outlet tube 6. Situated next to the outside plates are annular electrical insulating rings 7 and 8. The insulating rings separate plates 1 and 2 from the annular ring shaped current collectors 9 and 10. The function of the current collectors is to introduce and pick up current from the electrodes 11 and 12. Attached to the current collectors 9 and 10 are catalyst impregnated porous anode 11 and catalyst impregnated porous cathode 12. Extending from current collector 9 and current collector 10 are electrical leads 13 and 15 connected to electrical load device 14. Sandwiched between anode 11 and cathode 12 is an annular ring 16 constructed of electrical insulator material and containing the borophosphoric acid-phosphoric acid electrolyte 17 of the invention. The components of the fuel cell are bolted together with bolts 18 and 19.

In the operation of the cell described in the drawing, the fuel and oxidizer are respectively introduced into the cell through gas inlet tubes 3 and 5 and the fuel being passed over the surface of anode 11 and the oxidizer over cathode 12. The unutilized fuel and oxidizer respectively exhausted from gas outlet tubes 5 and 6. The electrical output is available at terminals 13 and 15 to which an electrical load 14, for example, an electrical motor, can be connected. Under the preferred conditions when hydrogen is used as fuel, the hydrogen and/or oxygen gas are saturated with water such as bubbling therethrough in order to prevent the conversion of the phosphoric acid in the electrolyte into the high resistance pyrophosphonic acid. Dry gas tends to strip out water produced by decomposition of the electrolyte thereby accelerating said decomposition.

EXAMPLE I

This example illustrates the preparation of the borophosphoric acid-phosphoric acid gel of the invention.

To 0.2 mole of boric acid there was added with stirring 0.7 mole of 85 wt. percent phosphoric acid. The mixture was heated to 200° C. for a period of 72 hours and cooled. The resultant product had a penetration at 25° C. (ASTM D–1403) of 220 and 200 at 200° C. The product was found to be a mixture of $BPO_4$ and $H_3PO_4$ in a mole ratio of $BPO_4:H_3PO_4$ of 1:2.5. It was a smooth, white buttery paste easily workable at 25° C. or 200° C. and showed no signs of bleeding (expelling droplets of phosphoric acid) or drying for at least two weeks when maintained at a temperature of 200° C. The specific conductivity of the product was found to be 0.3 mho per centimeter at 200° C. of electrolyte thickness.

EXAMPLE II

This example illustrates the operation of a fuel cell utilizing the electrolyte of the invention.

The fuel cell employed is of the design described in the figure of the drawing. The end plates are constructed of stainless steel. The electrical insulators are 2" diameter Teflon (tetrafluoro ethylene) rings of 1/8" thickness. The current collector rings are made of tantalum having an inner diameter of 1½" and an outer diameter of 2" and a thickness of 1/16". A tab on each tantalum current collector ring provides a location for soldering external copper leads. The current collectors are employed because the carbon electrodes used have a relatively low electrical conductivity and provide no ready location for connection of external leads. The electrodes are platinum impregnated carbon electrodes 2" squares of 1/8" thickness. The electrolyte retainer ring is a Teflon ring having an inner diameter of 1 7/8" and a thickness of 1/16". This ring is called the electrolyte retainer ring. The copper leads were connected into a voltmeter and ammeter for electrical energy measurement.

Porous carbon electrodes (anode and cathode) employed were of a density of 1.35 gms./cc., a resistancy of 0.0035 ohms/inch, a pore diameter 1–10 microns, and a porosity of 45%, before treatment in $CO_2$ at 900° C. The porous carbon electrodes were heated in an atmosphere of carbon dioxide at 900° C. to form tapered pores with the narrowest portion of the pores being at the interior center of the electrode. This treatment increases the effective surface area of the electrode.

The carbon electrodes were then treated with platinum catalyst after they had been boiled in distilled water (to remove loose carbon) and dried in air at 150° C. Previously used electrodes were first boiled in dilute aqua regia (one part HCl, one part $HNO_3$ and two parts $H_2O$) to remove foreign material. Platinum was impregnated on the electrode in an amount of 1–25 milligrams of Pt/sq. cm. of electrode exterior surface by placing thereon an alcohol solution of chloroplatinic acid (two grams $H_2PtCl_6 \cdot 6H_2O$ in 20 mls. of 91 vol. percent ethanol and 9 vol. percent methanol). The solution was applied by painting or dripping on one side of the carbon electrode plate. The carbon electrode plates were then treated with hydrogen at 225° C. to reduce the applied chloroplatinic acid to platinum.

The above cell had the borophosphoric acid-phosphoric acid electrolyte of Example I completely filling the annular space of the electrolyte holder 16 and the cell was bolted together with bolts 18 and 19. The cell was heated to a temperature of 208° C. and hydrogen was introduced through gas inlet tube 3 at a rate of 40 cc. per minute and oxygen is introduced through gas inlet tube 5 at a rate of 40 cc. per minute. An identical second cell was also employed under the aforementioned conditions except the cell operating temperature was 210° C. The results are reported below:

CELL PERFORMANCE DATA FOR CELL WITH $CO_2$ TREATED Pt IMPREGNATED ELECTRODES

|  | Cell #1 | | Cell #2 | |
| --- | --- | --- | --- | --- |
| Temperature of Operation, ° C. | 208 | 210 | 210 | 210 |
| Hours of Operation | 2 | 15 | 376 | 744 |
| Open Circuit Voltage, v. | 0.87 | 0.93 | 0.89 | 0.89 |
| Cell Power at 0.4 v., w./ft.[2] [a] | 85 | 63 | 55 | 52 |
| Cell Power at 0.7 v., w./ft.[2] | 41 | 43 | 33 | 32 |
| Short Circuit current density, amp./ft.[2] [b] | 400 | 290 | 256 | 240 |
| Cell Resistance, ohms | 0.13 | 0.13 | 0.15 | 0.16 |

[a] w./ft.[2]=watts/ft.[2] of exposed electrode surface.
[b] amp./ft.[2]=amperes/ft.[2] of exposed electrode surface.

EXAMPLE III

This example illustrates the operation of the borophosphoric acid-phosphoric acid electrolyte fuel cell utilizing various fuel mixtures and oxygen oxidizer at 200° C. The electrolyte, fuel cell and procedure were essentially those described in Examples I and II. Before introduction in the cell, hydrogen when used as fuel and oxygen oxidizer were bubbled through water at 25° C. The cell performance data is recorded below:

CELL PERFORMANCE ON VARIOUS FUEL MIXTURES AT 200° C.

| Fuel | Flow to cell in cc. at STP minute | Open Circuit Voltage, v. | Maximum cell power density, watts/ft.$^2$ |
|---|---|---|---|
| $H_2$ | 40 | 0.98 | 57.0 at 0.5 v. |
| $CO$ + $H_2O$ | 40 / 40 | 0.45 | 2.9 at 0.18 v. |
| $CH_3OH$ + $H_2O$ | 75 / 75 | 0.54 | 6.3 at 0.22 v. |
| $C_3H_8$ + $H_2O$ | 10 / 20 | 0.7 | 13.5 at 0.3 v. |

EXAMPLE IV

This example illustrates the intermittent operation of the borophosphoric acid-phosphoric acid electrolyte fuel cell. The electrolyte, fuel cell and procedure of Example I and Example II were employed. The fuel cell was heated to about 200° C. each day for six days. Performance data was taken and the fuel cell was cooled. No adverse effects were observed during six days of this start up-shut down experiment. The data and results are found below:

FUEL CELL PERFORMANCE WHEN VARYING CELL TEMPERATURES FROM DAY TO DAY

| Day | Temp, °C. | Cell Res., ohms | Open Circuit voltage, v. | Maximum Power Density, watts/ft.$^2$ | Maximum Circuit Density, amp./ft.$^2$ |
|---|---|---|---|---|---|
| 1 | 139 | 0.22 | 0.80 | 9.7 | 50 |
| 2 | 200 | 0.21 | 0.76 | 10.0 | 47 |
| 3 | 185 | 0.22 | 0.76 | 10.0 | 47 |
| 4 | 200 | 0.22 | 0.76 | 10.8 | 54 |
| 5 | 230 | 0.23 | 0.77 | 10.5 | 48 |
| 6 | 210 | 0.23 | 0.77 | 10.5 | 50 |

EXAMPLE V

This example demonstrates that impurities in the fuel gas, such as $CO_2$ do not poison the function of the borophosphoric acid-phosphoric acid of the invention.

The electrolyte, fuel cell and procedure of Examples I and II were employed and it was found that when the hydrogen fuel feed was diluted with $CO_2$ so that the feed was only 25 wt. percent $H_2$, the power produced by the cell was ⅔ the power of the cell when pure $H_2$ was utilized as the fuel feed.

EXAMPLE VI

This example illustrates the unique property of the electrolyte of the invention, namely, its relatively unchanging consistency between 25 and 200° C. to demonstrate this in quantitative terms, the penetration of the several compositions of the electrolyte was measured at various temperatures using the ASTM Test No. D-1403, Grease Penetration, ¼ Scale. The data and results are in the following table:

PENETRATION OF BOROPHOSPHORIC ACID GELLED PHOSPHORIC ACID ELECTROLYTE AT SEVERAL TEMPERATURES AND CONCENTRATIONS OF GELLING AGENT

| Run | Electrolyte Components | Component Content, Mole Percent | Electrolyte Temperature, °C. | Penetration |
|---|---|---|---|---|
| A | $BPO_4$ / $H_3PO_4$ | 25 / 75 | 24 | 253 |
| B | $BPO_4$ / $H_3PO_4$ | 25 / 75 | 107 | 283 |
| C | $BPO_4$ / $H_3PO_4$ | 25 / 75 | 211 | 275 |
| D | $BPO_4$ / $H_3PO_4$ | 33 / 67 | 24 | 200 |
| E | $BPO_4$ / $H_3PO_4$ | 33 / 67 | 107 | 208 |
| F | $BPO_4$ / $H_3PO_4$ | 33 / 67 | 165 | 170 |

EXAMPLE VII

This example illuntrates the long life characteristics of borophosphoric acid-phosphoric acid fuel cell of the invention.

Two fuel cells (Cell I and Cell II) of the type described in Example III were placed into operation. The electrolyte gel of Example I was utilized. The procedure of Example III was essentially employed except the cells were operated at 210° C. under continuous current drains of about 100 amp/ft.$^2$ at 0.4 v. The results are reported below:

| Hours of Cell Operation | 100 | 600 | 800 | 1500 |
|---|---|---|---|---|
| Cell I, watts/ft.$^2$ | 46 | 38 | 35 | 30 |
| Cell II, watts/ft.$^2$ | 62 | 49 | 42 | |

EXAMPLE VIII

This example illustrates the necessity of maintaining the bhosphoric acid in the electrolyte in the orthophosphoric acid form rather than the pyrophosphoric form.

The specific conductivity of several $$H_2O = H_3PO_4 = P_2O_5$$

compositions were determined in which the $P_2O_5$ content was varied from 16.9 mole percent to 33 mole percent. A concentration of 25 mole percent $P_2O_5$ represents a solution equivalent to 100% $H_3PO_4$ (o-phosphoric acid) and 33 mole percent $P_2O_5$ represents a solution equivalent to 100% $H_4P_2O_7$ (pyrophosphoric acid). The conductivity data is reported below:

CONDUCTIVITY OF PHOSPHORIC ACID SOLUTIONS WITH EXTENDED HEATING

| Solution, Mole Percent $P_2O_5$ | Temp., °C. | Initial Specific Conductivity, mho cm.$^{-1}$ |
|---|---|---|
| 16.9 | 150 | 0.498 |
| 16.9 | 175 | 0.576 |
| 16.9 | 200 | 0.630 |
| 20.1 | 200 | 0.693 |
| 24.6 | 200 | 0.587 |
| 30.8 | 200 | 0.399 |
| 33.0 | 200 | 0.296 |

I claim:
1. A fuel cell electrolyte gel composition comprising porophosphoric acid and o-phosphoric acid in a mole ratio of borophosphoric acid to o-phosphoric acid of between about 1:6 and 1:1.

2. A fuel cell electrolyte gel in accordance with claim 1 wherein said mole ratio is between about 1:5 and 1:3.

3. A method of preparing a fuel cell electrolyte gel comprising the mixing of boric acid with o-phosphoric acid at a temperature between about 150 and 250° C. in a mole ratio of said boric acid to said phosphoric acid between about 1:7 and 1:2.

4. In a fuel cell for production of electrical energy by the decomposition of a fuel gas and oxidizing gas only, a fuel cell electrolyte gel comprising a mixture of borophosphoric and orthophosphoric acid in a mole ratio of borophosphoric acid to o-phosphoric acid of between about 1:6 and 1:1.

5. A process for operating fuel cells containing a borophosphoric acid-orthophosphoric electrolyte gel mixture in an ingredient ratio of borophosphoric to orthophosphoric acid of between 1:6 and 1:1 for the generation of electrical energy which comprises quantitatively oxidizing a gaseous fuel selected from the group consisting of gaseous saturated aliphatic hydrocarbons, carbon monoxide, hydrogen, methyl alcohol and mixtures thereof while maintaining the said fuel cell at a temperature between about 100 and 250° C.

6. A method in accordance with claim 5 wherein said fuel is hydrogen and said oxidizer is oxygen.

7. A method in accordance with claim 6 wherein electrodes in said fuel cell are porous carbon electrodes having a platinum catalyst plated thereon, and said fuel and oxidizer are saturated with water vapor prior to introduction into said fuel cell.

References Cited

UNITED STATES PATENTS

| 3,061,658 | 10/1962 | Blackmer | 136—86 |
| 3,202,546 | 8/1965 | Rightmire | 136—86 |
| 3,252,837 | 5/1966 | Satterfield | 136—86 |

ALLEN B. CURTIS, *Primary Examiner.*

WINSTON A. DOUGLAS, *Examiner.*

H. FEELEY, *Assistant Examiner.*

UNITED STATES PATENT OFFICE
CERTIFICATE OF CORRECTION

Patent No. 3,375,138  March 26, 1968

William B. Mather, Jr.

It is certified that error appears in the above identified patent and that said Letters Patent are hereby corrected as shown below:

Column 2, line 55, "gasses" should read -- glasses --. Column 3, line 23, the right-hand portion of the formula reading "$HPO_4$" should read -- $H_3PO_4$ --. Column 7, line 31, "139" should read -- 193 --. Column 8, line 23, "bhosphoric" should read -- phosphoric --; line 27, "$H_2O=H_3PO_4=P_2O_5$" should read -- $H_2O-H_3PO_4-P_2O_5$ --; line 53, "porophosphoric" should read -- borophosphoric --; line 63, after "for" insert -- the --.

Signed and sealed this 2nd day of December 1969.

SEAL)
Attest:

Edward M. Fletcher, Jr.  WILLIAM E. SCHUYLER, JR.
Attesting Officer  Commissioner of Patents